United States Patent

[11] 3,577,906

| [72] | Inventor | John K. Preuss<br>520 N.W. 144th St., Miami, Fla. 33168 |
|---|---|---|
| [21] | Appl. No. | 826,562 |
| [22] | Filed | May 21, 1969 |
| [45] | Patented | May 11, 1971 |

[54] GREASE-CATCHING DEVICE
3 Claims, 2 Drawing Figs.

[52] U.S. Cl...................................................... 99/234R,
99/444
[51] Int. Cl....................................................... A47j 43/28
[50] Field of Search.......................................... 99/444,
375, 400, 405, 408, 425, 431, 445, 446, 234 (R);
220/1, 10, 85, 95

[56] References Cited
UNITED STATES PATENTS
| 3,015,406 | 1/1962 | Nolte............................. | 220/10X |
| 3,367,525 | 2/1968 | Elder............................. | 220/1 |

*Primary Examiner*—Walter A. Scheel
*Assistant Examiner*—Arthur O. Henderson
*Attorney*—Ernest H. Schmidt ABSTRACT: A cylindrical object having an open top and bottom and a flotation ring. This device when placed in stock pots containing soups, stews and the like, enables the user to skim the top of the contents of the pot allowing the grease to be easily dipped from the device without losing any of the contents in the pot.

Patented May 11, 1971

3,577,906

INVENTOR.

John K. Preuss

GREASE-CATCHING DEVICE

This invention relates to kitchen utensils, and more particularly to a device for entrapment of grease.

It is therefore the main purpose of this invention to provide a grease-catching device which will have a flotation ring secured at the upper extremity of the device in order that it may float on top of the food content such as soups, stews and the like within a pot and by the user manipulating the device the grease being lighter than the contents of the pot and on top of the contents will be entrapped within the cylindrical portion of the device in order that the grease may be taken off without removing the basic food content of the pot.

Another object of this invention is to provide a device which will be of such construction so as to allow the user to easily dip the grease from within the cylindrical portion of the device without removing the food content of the pot and this device allows for the skimmed grease to be used for a number of other purposes.

A further object of this invention is to provide a device of the described type which will enable the user to quickly remove the grease in a minimum of time as compared with methods of the prior art and the device will have a ring portion to thus enable it to be hung in a closet or on a wall when not in use.

Other objects of the present invention are to provide a grease-catching device which is simple in design, inexpensive to manufacture, rugged in construction, easy to use and efficient in operation.

Figure 1:
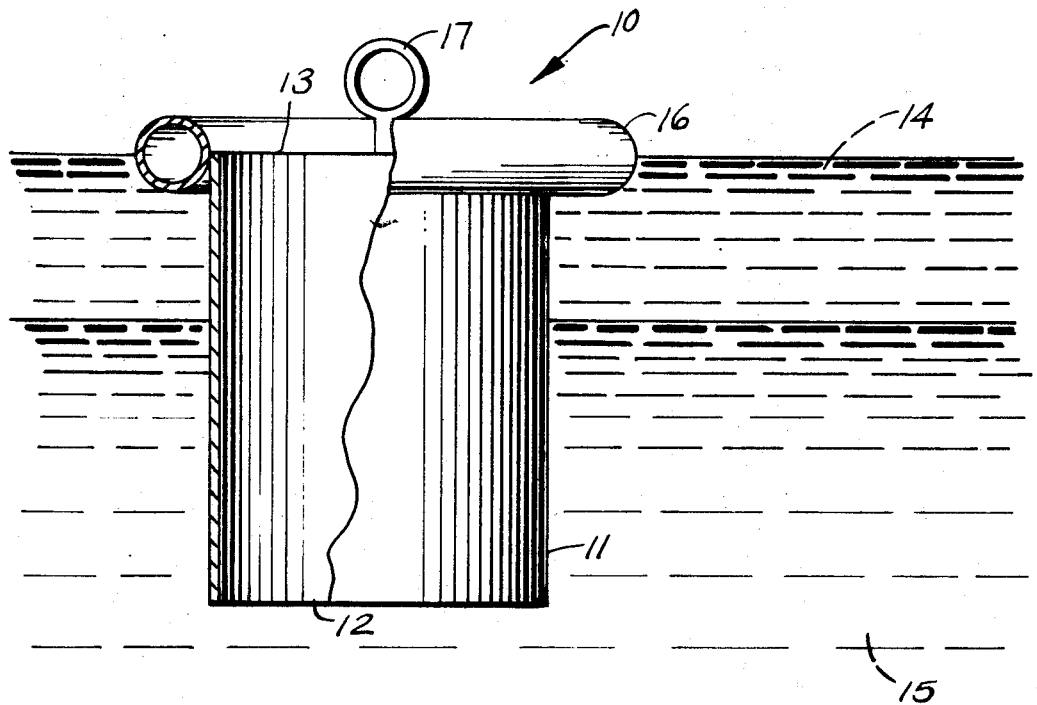
Figure 2:
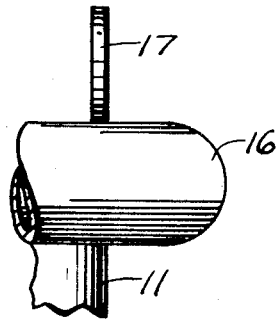

These and other objects will become readily evident upon a study of the following specification together with the accompanying drawing wherein:

FIG. 1 is a vertical view of the present invention shown within a liquid and partly broken away; and FIG. 2 is a fragmentary side view of FIG. 1.

According to this invention, a grease catching device 10 is provided with a hollow cylinder 11 made of light metal or other suitable heat-resisting material. Cylinder 11 is provided with a bottom open end 12 and an upper open end 13 in order to entrap grease 14 floating on top of food 15 within a vessel (not shown). To the upper extremity of cylinder 11 is secured fixedly a hollow continuous ring 16 which serves as a flotation collar upon cylinder 11 enabling it to remain buoyant on top of grease 14. Also to the upper extremity of cylinder 11 is fixedly secured a loop portion 17 providing handle means for the user and also hanging means for device 10 when it is not in use.

In use, device 10 is placed into the vessel (not shown) and due to the hollow ring 16 remains afloat on top of the grease 14 which being lighter than the food 15 rises to the top. The user grasps the loop 17 of device 10 and proceeds to tilt and skim grease 14 from the top of food 15, the grease 14 settling within the interior of cylinder 11 whereupon it may be dipped by suitable means without removing the food 15 from the vessel. Alternatively, the device is used by skimming the floating grease in the vessel with a large spoon or a ladle and pouring it into the top of the device, whereat the grease will separate and float to the top for subsequent removal when fully collected in this manner by use of a grease-removing ladle dipped through the top of the device.

It shall be noted that device 10 is particularly useful when soups, stews, gravies and the like are to be greaseless for special diets and the present device also allows for the skimming of expensive chicken fat from foods thereby saving money and the skimmed grease may be used for roux, starting sauces, soups and the like.

It shall further be noted that the device herein described is adaptable for use in large and small kitchens and it may be constructed in various sizes so as to serve in a variety of situations.

I claim:

1. A grease-catching device for kitchen use, comprising an elongated cylinder of tubular form and open at each end, and means carried by the upper end of said elongated cylinder for floating said cylinder in an upright immersed position within fluid in a cooking vessel.

2. A grease-catching device as defined in claim 1, wherein said flotation means is of circular shape circumjacent the open upper end of said cylinder.

3. A grease-catching device as defined in claim 2, wherein said flotation means is in the form of a hollow ring, and a loop secured to the upper extremity of said cylinder for hangingly supporting the device when not in use.